US008806330B2

(12) United States Patent
Mahmud (10) Patent No.: US 8,806,330 B2
(45) Date of Patent: Aug. 12, 2014

(54) AUTOMATIC DETECTION OF ITEM LISTS WITHIN A WEB PAGE

(75) Inventor: Jalal U. Mahmud, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/586,322

(22) Filed: Aug. 15, 2012

(65) Prior Publication Data
US 2013/0055068 A1 Feb. 28, 2013

Related U.S. Application Data

(63) Continuation of application No. 13/218,686, filed on Aug. 26, 2011.

(51) Int. Cl.
*G06F 17/00* (2006.01)
*G06F 17/30* (2006.01)

(52) U.S. Cl.
USPC ........... 715/234; 715/760; 715/738; 715/854; 707/778; 707/797

(58) Field of Classification Search
USPC ......... 715/234, 200, 202, 204, 205, 209, 255, 715/256, 273, 700
See application file for complete search history.

(56) References Cited

U.S. PATENT DOCUMENTS

| | | | | |
|---|---|---|---|---|
| 6,489,968 B1 * | 12/2002 | Ortega et al. | ................. | 715/713 |
| 7,836,399 B2 | 11/2010 | Gurcan et al. | | |
| 8,086,957 B2 * | 12/2011 | Bauchot et al. | ............... | 715/234 |
| 2005/0022116 A1 * | 1/2005 | Bowman et al. | ............... | 715/513 |
| 2008/0052298 A1 * | 2/2008 | Yeh | ................................ | 707/100 |
| 2008/0115057 A1 * | 5/2008 | Grandhi et al. | ............... | 715/272 |
| 2010/0083095 A1 | 4/2010 | Nikovski et al. | | |
| 2010/0174774 A1 | 7/2010 | Kern et al. | | |
| 2012/0198342 A1 * | 8/2012 | Mahmud | ........................ | 715/733 |

FOREIGN PATENT DOCUMENTS

| | | |
|---|---|---|
| CN | 101571860 | 11/2009 |
| CN | 101944094 | 1/2011 |
| CN | 102142016 | 8/2011 |

OTHER PUBLICATIONS

International Search Report and Written Opinion dated Dec. 20, 2012 for International Application No. PCT/IB2012/053596.
Non-Final Office Action dated Feb. 28, 2013 received for U.S. Appl. No. 13/218,686.
Dontcheva, M. et al., "Relations, Cards, and Search Templates: User-Guided Web Data Integration and Layout", in UIST '07, Oct. 7-10, 2007, pp. 61-70, Newport, Rhode Island, USA.

(Continued)

*Primary Examiner* — Maikhanh Nguyen
(74) *Attorney, Agent, or Firm* — Fleit Gibbons Gutman Bongini & Bianco PL; Thomas Grzesik (57) ABSTRACT

Embodiments of the invention relate to detecting items lists. In one embodiment, a web browsing interaction history of a user associated with a given web page is analyzed. The web browsing interaction history indicates that the user interacted with at least one element of the web page. A document object model (DOM) of the given web page is constructed. A node within the DOM corresponding to the element in the web page is identified based on analyzing the web browsing interaction history. An ancestor node of the node that corresponds to an item list within the web page comprising the element is identified based on at least a distribution of child tags of the ancestor node.

12 Claims, 9 Drawing Sheets

(56) References Cited

OTHER PUBLICATIONS

Sun, Z. et al., "Model-directed Web Transactions under Constrained Modalities". In WWW '06, May 22-26, 2006, pp. 447-456, Edinburgh, UK.

Mahmud, J. et al., "Assistive Browser for Conducting Web Transactions". In IUI '08, Jan. 13-16, 2008, pp. 365-368, Maspalomas, Gran Canaria, Spain.

Okoye, I. et al., "Find This for Me: Mobile Information Retreival on the Open Web", IUI 2011, Feb. 13-16, 2011, pp. 1-10, Palo Alto, California.

Embley, D.W. et al., "Record-Boundary Discovery in Web Documents", SIGMOD, Jun. 1999, pp. 1-24, Provo. Utah, USA.

Mukherjee, S. et al., "Automatic Annotation of Content-Rich HTML Documents: Structural and Semantic Analysis", ISWC, Oct. 2003., pp. 533-549, New York, USA.

Cai, D. et al., "Vision-based Page Segmentation Algorithm", MSR Technical Report, Nov. 1, 2003, pp. 1-29, Redmond, WA, USA.

Li, I. et al., "Here's What I Did: Sharing and Reusing Web Activity with ActionShot". CHI 2010, Apr. 10-15, 2010, Atlanta, Georgia, UA, pp. 1-10.

Final Office Action dated Jun. 21, 2013 received for U.S. Appl. No. 13/218,686.

\* cited by examiner

```
<div id="search-results">
  <div class="refinement-overlay">   </div>
  <div id="search-content">
    <div id="results">
      <div id="ld-9140889" class="clearfix result track-listing vcard">
        <div class="listing-content">
          <div class="rank pin">1</div>
          <div class="info">
            <h3 class="business-name fn org">
              <a class="no-tracks url" onclick="ypc_logs.set ({"lid":"6b8decd0-928a-012e-56bc-18a9053e5582","lt":1600, "rid":"d-6b614a50-928a-012e-56bc-18a9053e5582","to1":2,"pf":null,"rtid":-1,"t":"listing"}) .callClick();
              omniture.callClick({"eVar6":1600,"eVar9":1,"eVar21":"search_results","eVar50":null,"pro
              atti_logs.attiClick({"lid":"6b8decd0-928a-012e-56bc-18a9053e5582","lt":1600,"ptid":"URL_A","rid":"d-6b614a50-928a-012e-56bc-18a9053e5582","lt":1600,"ptid":"URL_A","rid":"d-6b614a50-928a-012e-56bc-18a9053e5582","lt":1600,"ptid":"URL_A","rid":"d-6b614a50-928a-012e-56bc-18a9053e5582","ypid":9140889,"lid":9140889,"vrid":"4e381ac0-9264-012e-
            </h3>
          </div>
        </div>
      </div>
    </div>
  </div>
</div>
```

FIG. 4

```
<div id="lid-9140889" class="clearfix result track-listing vcard">
  <div class="listing_content">
    <div class="rank pin">>1</div>
    <div class="listing-info">
      <h3 class="business-name fn org">
      <span class="listing-address adr">
        <span class="street-address"> Address_1, </span>
        <span class="city-state">
      </span>
      <a class="map-link no-tracks" rel="nofollow" onclick="ypc_logs.set({"lid":"6b8decd0-928a-012e-56bc-18a9053e5582","rid":"d-6b614a50-928a-012e-56bc-18a9053e5582","tt":13,"tid":-1","t":"listing"}).callClick();;
omniture.callClick({"lid":"6b8decd0-928a-012e-56bc-18a9053e5582","tt":13,"eVar6":13,"eVar9":1,"eVar21":"search_results","eVar50":null, "prop17":
att_logs.attiClick({"lid":"6b8decd0-928a-012e-56bc-18a9053e5582","tt":13,"ptid":"URL_A","rid":"d-6b614a50-928a-012e-56bc-18a9053e5582","ypid":"9140889","lid":"9140889","vrid":"4e381ac0-9264-012e-1403-0022649aefbe","nav":null}),"href="/san-jose-ca/mip/Gas_Station-9140889
/map?lid=9140889">
      <span class="business-phone phone"> Phone_Number_1 </span>
      <span class="additional-phones"> </span>
      <div class="distance"> 8.4 miles </div>
    </div>
```

```
<div id="left-column">
  <h1> San Jose Gas Station</h1>
  <div class="clearfix">
  <div id="search-results">
    <div class="refinement-overlay">  </div>
    <div id="search-content">
      <div id="results">                                              ──602
        <div id="lid-9140889" class="clearfix result track-listing vcard">   ──604
          <div class="listing_content">                               ──620
          <div class="listing_actions">                               ──622
        </div>
        <div id="lid-7343944" class="clearfix paid-listing result track-listing vcard">  ──606
          <div class="listing_content">                               ──624
          <div class="listing_actions">                               ──626
        </div>
        <div id="lid-1148522" class="clearfix paid-listing result track-listing vcard">  ──608
        <div class="serp-silver serp-silver-style-3">                 ──610
        <div id="lid-4203506" class="clearfix paid-listing result track-listing vcard">  ──612
        <div id="lid-12177826" class="clearfix result track-listing vcard">              ──614
        <div id="lid-10769839" class="clearfix result track-listing vcard">              ──616
        <div id="lid-7163168" class="clearfix result track-listing vcard">               ──618
```

AUTOMATIC DETECTION OF ITEM LISTS WITHIN A WEB PAGE

CROSS-REFERENCE TO RELATED APPLICATIONS

This application is continuation of and claims priority from U.S. patent application Ser. No. 13/218,686 filed on Aug. 26, 2011; the entire disclosure is herein incorporated by reference in its entirety.

BACKGROUND

The present invention generally relates to web pages, and more particularly relates to automatically detecting item lists within a web page.

BRIEF SUMMARY

In one embodiment a method is disclosed. The method comprises analyzing a web browsing interaction history of a user associated with a given web page. The web browsing interaction history indicates that the user interacted with at least one element of the web page. A document object model (DOM) of the given web page is constructed. A node within the DOM corresponding to the element in the web page is identified based on analyzing the web browsing interaction history. An ancestor node of the node that corresponds to an item list within the web page comprising the element is identified based on at least a distribution of child tags of the ancestor node.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Operating Environment

Figure 1:
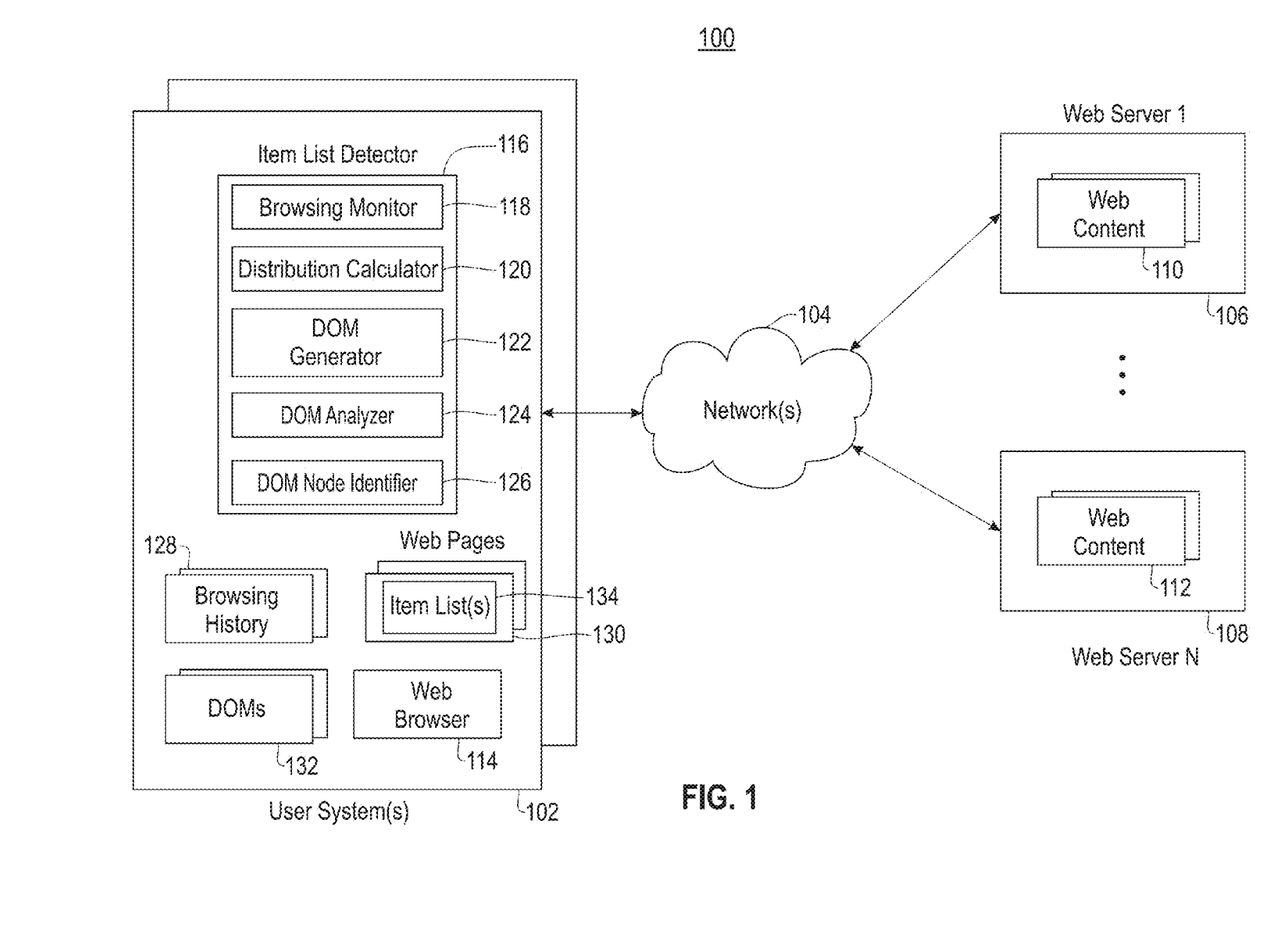
FIG. 1 is a block diagram illustrating one example of an operating environment according to one embodiment of the present invention.

FIG. 1 shows one example of an operating environment 100 applicable to various embodiments of the present invention. As shown, one or more user systems 102 are communicatively coupled to one or more networks 104. Additionally, N web servers 106, 108 are communicatively coupled to the network(s) 104. The network(s) 104, in this embodiment, is a wide area network, local area network, wired network, wireless network, and/or the like. Each web server 106, 108 comprises web content 110, 112 such as websites and their web pages that are accessible by a user of the user system 102 via an application such as a web browser 114. It should be noted that web content 110, 112 refers to any content that is displayable to the user via the web browser 114. The web content 110, 112 can reside within the web server 106, 108 or on a system coupled to the web server 106, 108. The user system(s) 102, in one embodiment, is a personal computer, notebook computer, workstation, PDA, cellular phone capable of browsing the Internet, tablet computing device, and the like. The network(s) 110, according to one embodiment, comprises a LAN, WAN, World Wide Web, wireless network, or the like.

The user system 102 comprises the web browser 114 and an item list detector 116. The item list detector 116 comprises a browsing monitor 118, a distribution calculator 120, a document object model (DOM) generator 122, a DOM analyzer 124, and a DOM node identifier 126. Each of these components is discussed in greater detail below. The user system 102 also comprises browsing history information 128 (also referred to herein as "browsing interaction information 128" or "interaction information 128"), web pages 130, and DOMs 132. It should be noted that one or more of these components shown within the item list detector 116 can reside within the web browser 114 as well. It should also be noted that one or more of the components of the user system 102 can reside outside of the user system 102.

The item list detector 116, in one embodiment, automatically detects item lists 134 within a web page 130 by leveraging browsing history information (interaction logs) 128 that is collected by recording a user's actions in that web page 130. An item list 134, in one embodiment, is a list of items presented in the web page 130 such as search results. An item list 134 is the taxonomy of items in a web page 130. The item list detector 116 uses the browsing history information 128 to determine when a user has interacted with an item of an item list 134. The item list detector 116 then identifies that interacted (e.g. clicked) item from the DOM tree in the DOM 132 of the web page 130. The item list detector 116 then computes a presentation pattern based feature of the item's parent element. A bottom-up traversal approach is then utilized by the item list detector 116 to find the DOM tree node with a repeating pattern such that each pattern represents one item in the list. The identified DOM node with the repeating pattern is then identified as the item list.

As can be seen, the item list detector 116 uses a "localized" clue, which is the interaction information 128 of an item if an item list 134, to detect the entire list. Therefore, the item list detector 116 does not require the use of any pre-defined template, domain knowledge, ontologies, manual labor for building models, or global search strategies, which may lead to inaccuracies. The item list detector 116 utilizes "localized" knowledge from browsing history information (e.g., interaction logs), and can detect an item list(s) unambiguously.

Automatic Detection of Item Lists in a Web Page

The following is a more detailed discussion on automatically detecting item lists in a web page. As discussed above, the item list detector 116 utilizes browsing history information 128 to automatically detect item lists 134. The browsing history information 128 is generated by the browsing monitor 118. The browsing history monitor 118 monitors the user's browsing history including various actions taken by the user with respect to the web content using the web browser 114. The browsing monitor 118 continually records web browsing history at the level of interactions, such as clicking on an item in an item list 134, entering a value into a form field, turning on a checkbox, clicking a button, etc. This goes beyond a conventional web history interface to give the user a more complete picture of the actions performed on every web page that is visited, as compared to just recording page titles and URLs. The information recorded by the browsing monitor 118 is stored as the browsing history information 128. The illustrated embodiment uses the method for recording such a browsing history that is described in Ian Li et al. "Here's what I did: sharing and reusing web activity with ActionShot" (CHI 2010: Proceedings of the 28th international conference on Human factors in computing systems, 2010, pp. 723-732), which is herein incorporated by reference in its entirety. Other methods for recording a user's web browsing history are used in further embodiments of the present invention.

Figure 2:
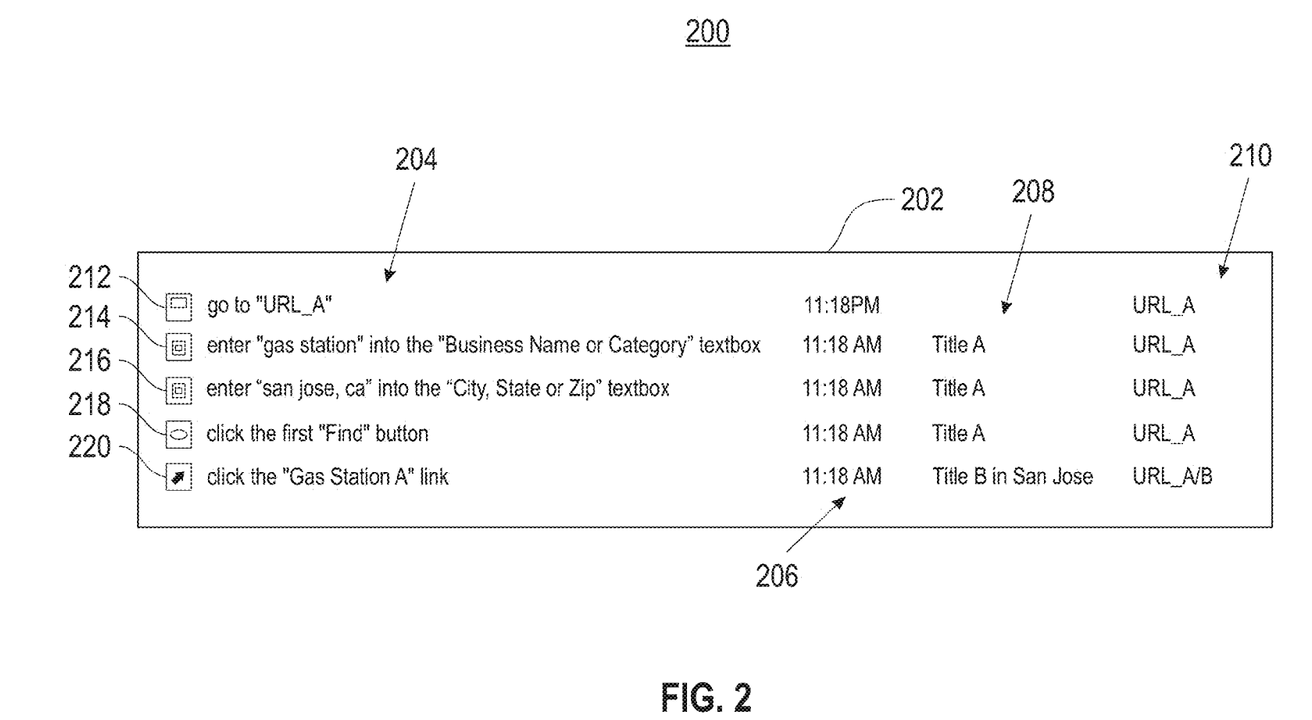
FIG. 2 illustrates one example of browser interaction information according to one embodiment of the present invention.

FIG. 2 shows an exemplary web browsing interaction history 200 that is used in one embodiment of the present invention. A user interface 202 displays the user's web browsing interaction history 200. In this embodiment, actions 204 performed at a web page of a website, time information 206, web page title information 208, and web page URL information 210 are displayed in one or more areas of the interface 202. Other types of information can also be maintained and displayed in the web browsing interaction history 128 as well.

Figure 3:
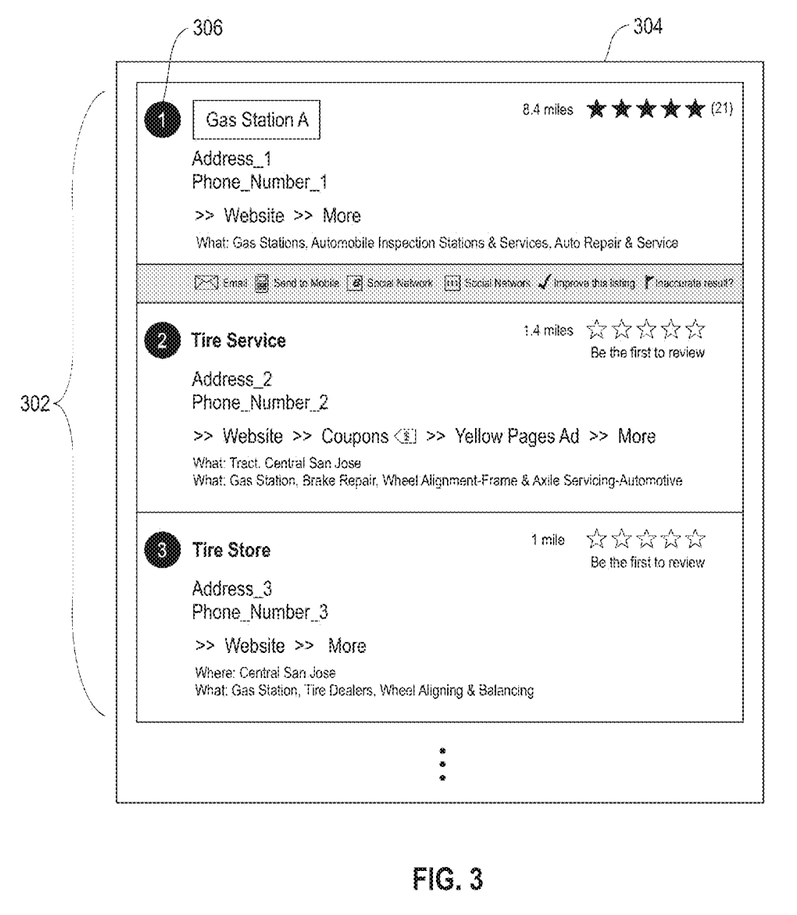
FIG. 3 illustrates one example of search results displayed to a user in response to the user interacting with an element of a web page according to one embodiment of the present invention.

The browsing interaction history 200 shown in FIG. 2 shows interaction logs recorded based on a user's interaction with a local directory search website. In particular, the browsing interaction history 200 comprises a first recorded interaction 212 indicating that the user entered a search keyword "gas station" into a "Business Name or Category" textbox. A second recorded interaction 214 indicates that the user entered "san jose, ca" into a "City, State, or Zip" textbox. A third recorded interaction 216 indicates that the user submitted the search form by clicking the "find" button, which resulted in a search result page being displayed that comprised a list of items that matched the users search query. FIG. 3 shows the first few items 302 for the search result item list 304 that was displayed to the in response to the web server 106 receiving the user's search query of "gas station" in "san jose, ca". Returning to FIG. 2, the browsing interaction history 200 further comprise a fourth recorded interaction 220 indicating that the user clicked on the "Gas Station A" link, which is the first link 306 shown in the items 302 of FIG. 3.

Figure 4:
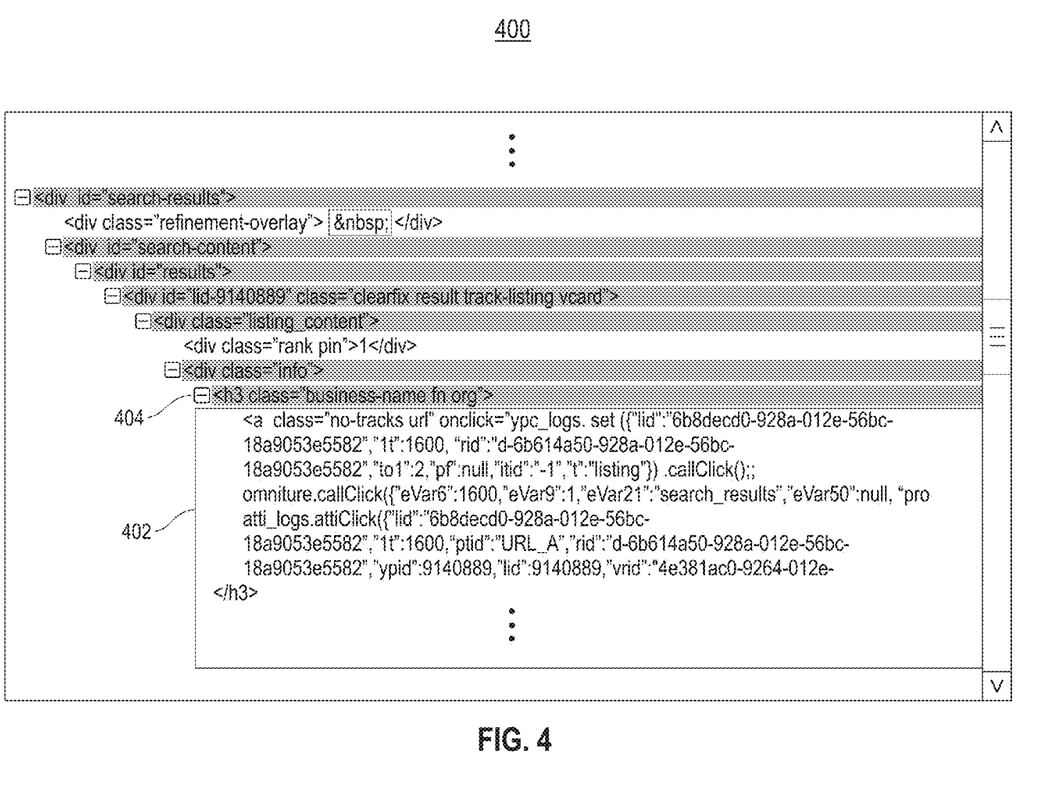
FIG. 4 illustrates one example of a document object model (DOM) highlighting an identified node corresponding to an item in a list interacted with by a user according to one embodiment of the present invention.

Once the browsing interaction history 200 for the web page 130 has been identified, the DOM generator 122 of the item list detector 116 generates/constructs a DOM 132 of the web page 130. For example, FIG. 4 shows a visualization of a DOM tree fragment 400 for the web page comprising the item list 304 shown in FIG. 3. The item list detector 116 then, for each set of interaction information (e.g., logs) 128, analyzes the DOM 132 for the web page 130 to determine if the interaction information was recorded as a result of interaction with an element in the web page 130 such that the element has an ancestor with repeating patterns.

For example, the DOM analyzer 124 of the item list detector 116 analyzes the DOM 132. The DOM node identifier 126 identifies the DOM node that corresponds to the element interacted by user. In some embodiments, the interaction information 128 comprises a specific pointer such as XPath to the DOM node, which makes this identification process straightforward. However, in other embodiments, the label of the interacted web page element (e.g. "Gas Station A") included in the interaction information 128 is used as a search term to find the specific DOM node from the DOM tree. This identified DOM node can be denoted as Ni. For example in FIG. 4, the highlighted node 402 (identified by the "<a" tag) in the DOM tree 400 corresponds to the first item 306 in the search result list 304 of FIG. 3. This highlighted DOM tree node 402 corresponds to the "Gas Station A" item 306.

Once the DOM node 402 is identified, the item list detector 116, via the distribution calculator 120, computes if the parent of Ni has a uniform a child node tag distribution. For example, if 5 of the child nodes are "div" tags then, 1 is a table tag, and 1 is an "h2" tag, then the child tag distribution is (div:5, table:1, h2:1). FIG. 4 shows the parent DOM node 404 of the list item "Gas Station A" 306. The only child node is the link node 402, (with HTML tag "<a"), so the distribution is a:1.

It should be noted that while computing the uniformity of child tag distribution, the distribution calculator 120 ignores tags that do not affect structure, such as text, p, script, br, and hr style tags. The distribution calculator 120 determines that a child tag distribution is uniform/similar if at-least X % of the child tags is equal and if the sub-tree underneath them also has a uniform/similar structure (e.g., at-least X % of the child tags are equal). Here X % is a threshold that can be varied according to the desired accuracy. To compute if the child nodes with similar tags have similar structure, the distribution calculator 120 computes the tag distribution of each of the child nodes, computes their similarity (e.g., computes a similarity measure), and uses a similarity threshold to declare a match. This process is similar to the process discussed above with respect to child tag distribution. However, while deciding if child nodes with similar tags have similar structure, the distribution calculator 120 looks for how many tags of these child nodes match, and declares a match if Y % of the child tags match, where Y is the similarity threshold. In the example illustrated in FIG. 4, the parent node 404 has only 1 child node, so the similarity of child tag distribution is not needed. However, the process for computing the similarity of child tag distribution is discussed further below with respect to performing this similarity test for an ancestor node of this parent DOM node 404.

If the child tag distribution of the parent node of Ni is not uniform/similar (based on the process for determining uniform distribution discussed above) or the distribution has only 1 child node, then the item list detector 116 continues searching the DOM tree in a bottom-up fashion to identify a node that has a uniform/similar child tag distribution with a uniform/similar child sub-tree structure, as discussed above with respect to the similarity threshold. If no such node is found, the item list detector 116 does not identify any item list for the interacted element corresponding to the interaction information 128.

However, if the child tag distribution is uniform/similar then the item list detector 116, via the DOM node identifier 126, identifies the parent node 404 as a candidate "item list" node. However, a bottom-up search is continued in order to ensure that a sub-list inside an item is has not been identified instead of the main item list. For example, the item list detector 116 performs the technique discussed above for the identified candidate "item list" node to determine if the parent of this candidate "item list" node also has a uniform/similar tag distribution. The item list detector 116 identifies this new parent node as a candidate "item list" if this node has such a uniform (or substantially similar) child tag distribution.

Figure 5:
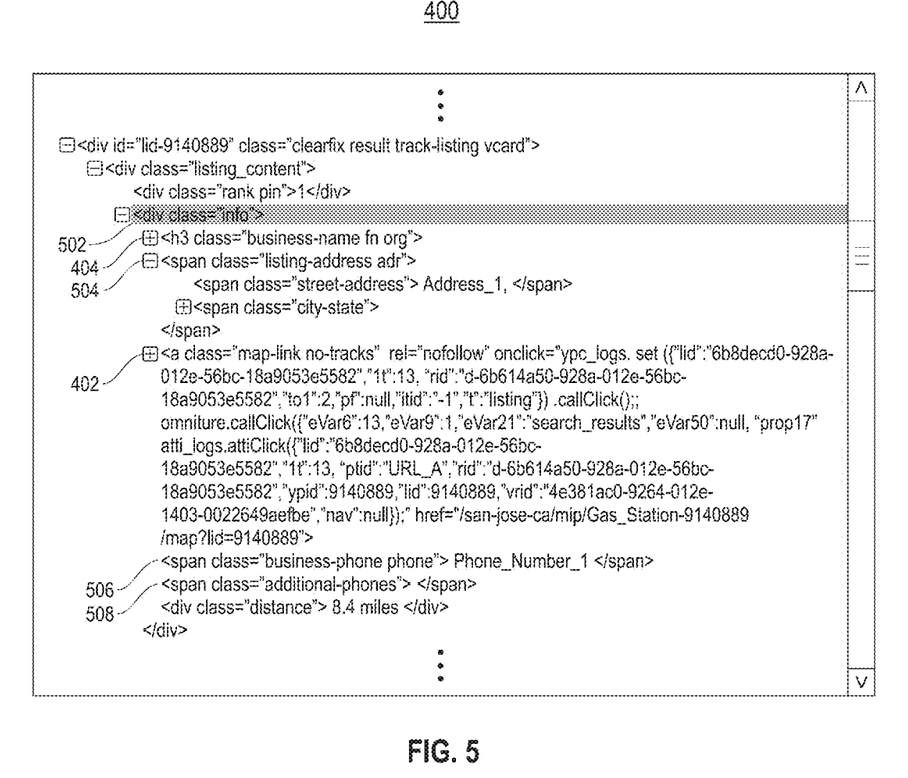
FIG. 5 shows the DOM of FIG. 4 in which a parent node of the identified node is highlighted according to one embodiment of the present invention.

For example, FIG. 5 shows a child tag distribution of the ancestor node 502 of the link node 402, "shell gas station" (e.g., the parent node 502 of the parent node 404 of the link node 402). This node 502 is tested as the DOM analyzer 124 goes bottom-up from the parent node 404 of the link node 402. This node 502 has 3 child nodes 504, 506, 508 (50% of the child nodes) which are span type nodes. In this example, this number, 50%, is lower than the threshold of 75%, so a second test that determines if the child node tag distribution of similar nodes is also similar is not required here. However, in this case such a test would fail since the child nodes of these span tag nodes 504, 506, 508 are not similar. For example, nodes 504, 506, 508 are potential similar nodes since they have matching tags. However, if the DOM analyzer 124 were to compute their child node distribution the DOM analyzer 124 would determine that these nodes are not similar since their tag distribution does not match. This second test is not required here since the percentage of nodes with matching tags is 50% which is below the threshold 75% in this example.

Figure 6:
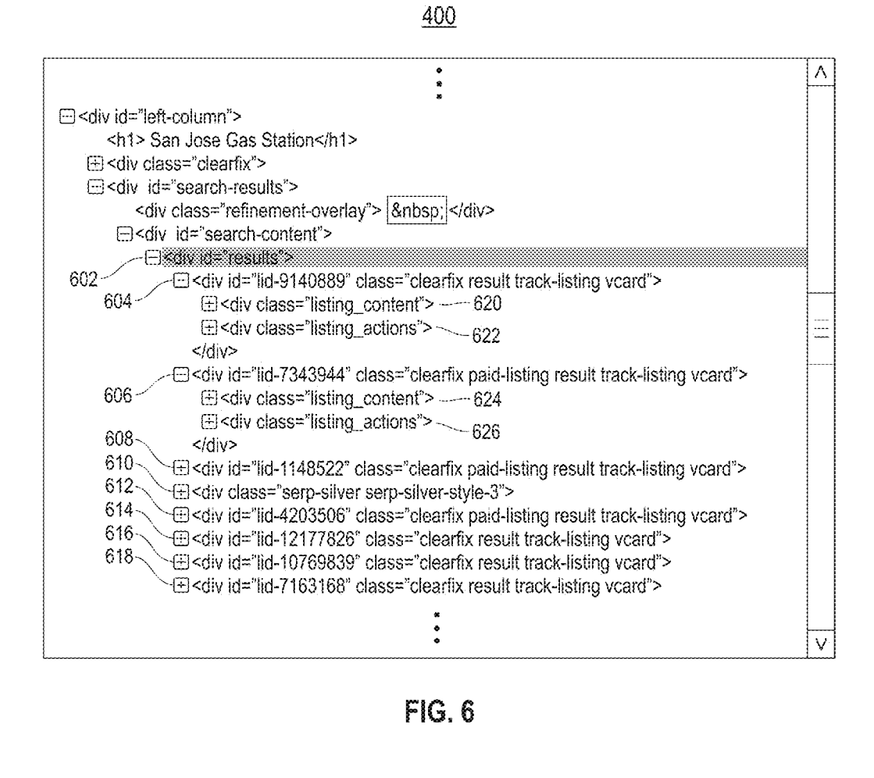
FIG. 6 shows the DOM of FIG. 4 in which an ancestor node of the identified node has been identified as the node corresponding to the item list of the web page associated with the DOM according to one embodiment of the present invention.

The DOM analyzer 124 continues traversing through the DOM tree in a bottom-up direction and determines that the above uniform/similarity test is successful for the ancestor DOM node 602 illustrated in FIG. 6. Here the child tags 604, 606, 608, 610, 612, 614, 616, 618 of the ancestor node 602 are div nodes, and the distributions of their child tags 620, 622, 624, 626 are also uniform/similar. Therefore, the DOM node identifier 126 identifies the ancestor node 602 an "item list" node. It should be noted that the DOM analyzer 124 also determines if any ancestor of the identified node 602 corresponding to the item list 134 has the same property that was used to identify the item-list 134. If so, then the item list detector 116 determines that the item-list 134 that has been identified based on the ancestor node 602 is contained in another list. In the current example, shown in FIG. 6, the parent DOM node 628 of the "item list" node 602 does not satisfy the above uniformity/similarity test and, therefore, is not identified as an item list node. Therefore, the list detector 116 completes the uniformity/similarity identification process and returns the identified "item-list" node 602 node corresponding to an item list 134.

As can be seen from the above discussion, the item list detector 116 uses a "localized" clue, which is the interaction information of an item of the list to detect the entire list. Therefore, the item list detector 116 does not require the use of any pre-defined template, domain knowledge, ontologies, manual labor for building models, or global search strategies, which may lead to inaccuracies. The item list detector 116 utilizes "localized" knowledge from browsing history information (e.g., interaction logs), and can detect an item list(s) unambiguously. This solution can be integrated to a variety of web applications where automatic item list detection is important such as, but not limited to, Web automaton applications, Information retrieval applications, and Web accessibility applications.

Operational Flow Diagrams

Figure 7:
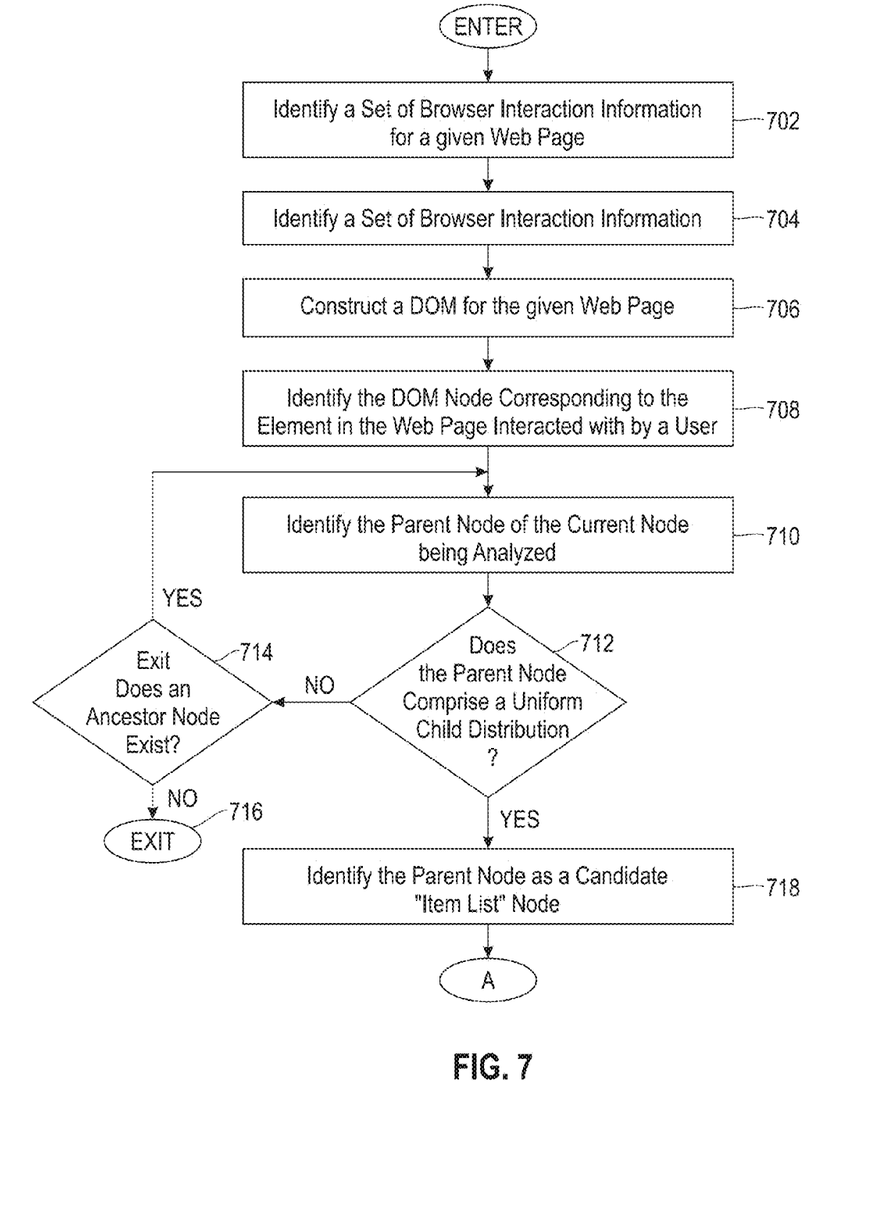
FIGS. 7-8 are operational flow diagrams illustrating one example of a process for automatically detecting item lists within a web page according to one embodiment of the present invention.
Figure 8:
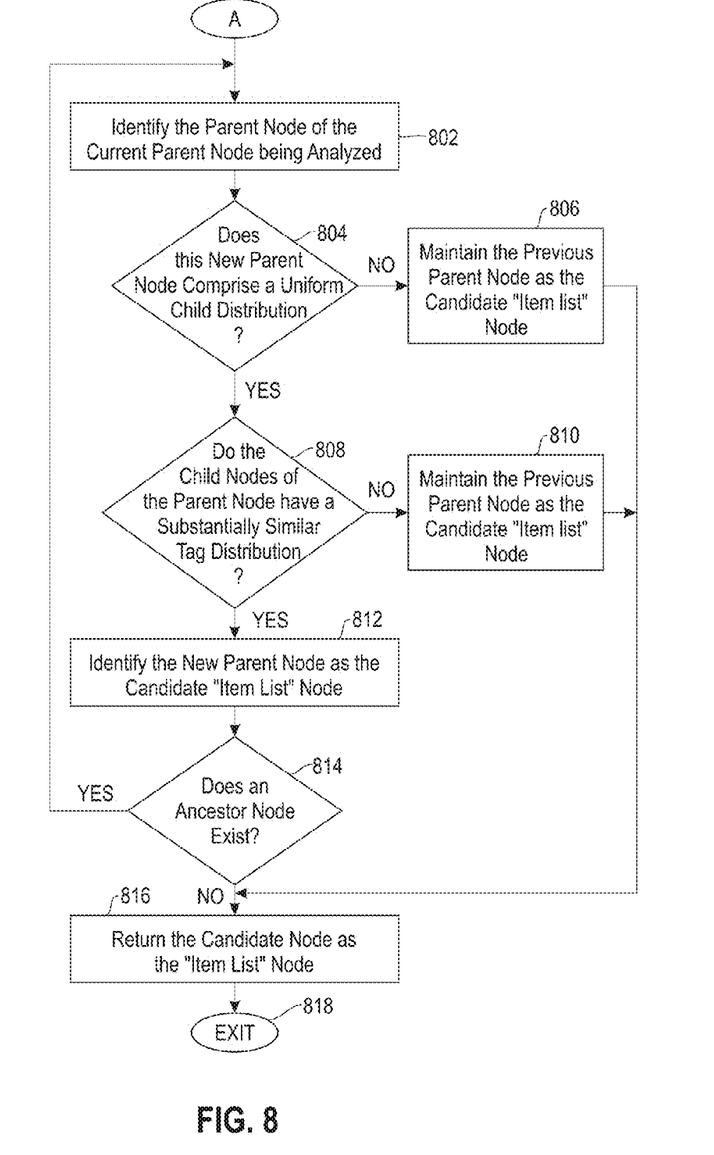

Referring now to FIGS. 7-8, the flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIGS. 7-8 are operational flow diagrams illustrating one overview of a process for automatically detecting item lists within a web page. It should be noted that a more detailed discussion with respect to this process has already been given above with respect to FIGS. 2-6. The operational flow of FIG. 7 starts at step 702 and flows directly into step 704. The item list detector 116, at step 704, identifies a set of browser interaction information 128 for a given web page 130. The set of browser interaction information 128 indicates that a user has interacted within an element of the web page 130.

The item list detector 116, at step 706, constructs a DOM 132 for the given web page 130. The item list detector 116, at step 708, identifies a DOM node corresponding to the element that the user interacted with. The item list detector 116, at step 710, identifies the parent node of the current node being analyzed, which this iteration is the DOM node corresponding to the element that the user has interacted with. The item list detector 116, at step 712, determines if the parent node comprises a uniform/similar child distribution, as discussed above. If the result of this determination is negative, the item list detector 116, at step 714 determines if an ancestor node exists (e.g., a parent node of the current parent node). If the result of this determination is positive, the control flow returns to step 710. If the result of this determination is negative, the control flow exits at step 716 and an item list is not identified within the web page 130.

If the result of the determination at step 712 is positive, the item list detector 116, at step 718, identifies the parent node as a candidate "item list" node. The control then flows to entry point A of FIG. 8 where the item list detector 116, at step 802, identifies the parent node of the current parent node identified as the candidate "item list" node. The item list detector 116, at step 804, determines if this new parent node comprises a uniform/similar child distribution, as discussed above. If the result of this determination is negative, the item list detector 116, at step 806, maintains the previous parent node as the candidate "item list" node. The control then flows to step 816.

If the result of the determination at step 804 is positive, the item list detector 116, at step 808, determines if the child nodes of the new parent node have a uniform/similar child distribution. If the result of this determination is negative, the item list detector 116, at step 810, maintains the previous parent node as the candidate "item list" node. The control then flows to step 816. If the result of this determination is positive, the item list detector 116, at step 812, identifies the new parent node as the candidate "item list" node. The item list detector 116, at step 814, determines if any ancestor nodes exist. If the result of this determination is positive, the control flow returns to step 802. If the result of this determination is negative, the item list detector 116, at step 816, identifies the current candidate "item list" node as the "item list" node. The control flow then exits at step 818.

Information Processing System

Figure 9:
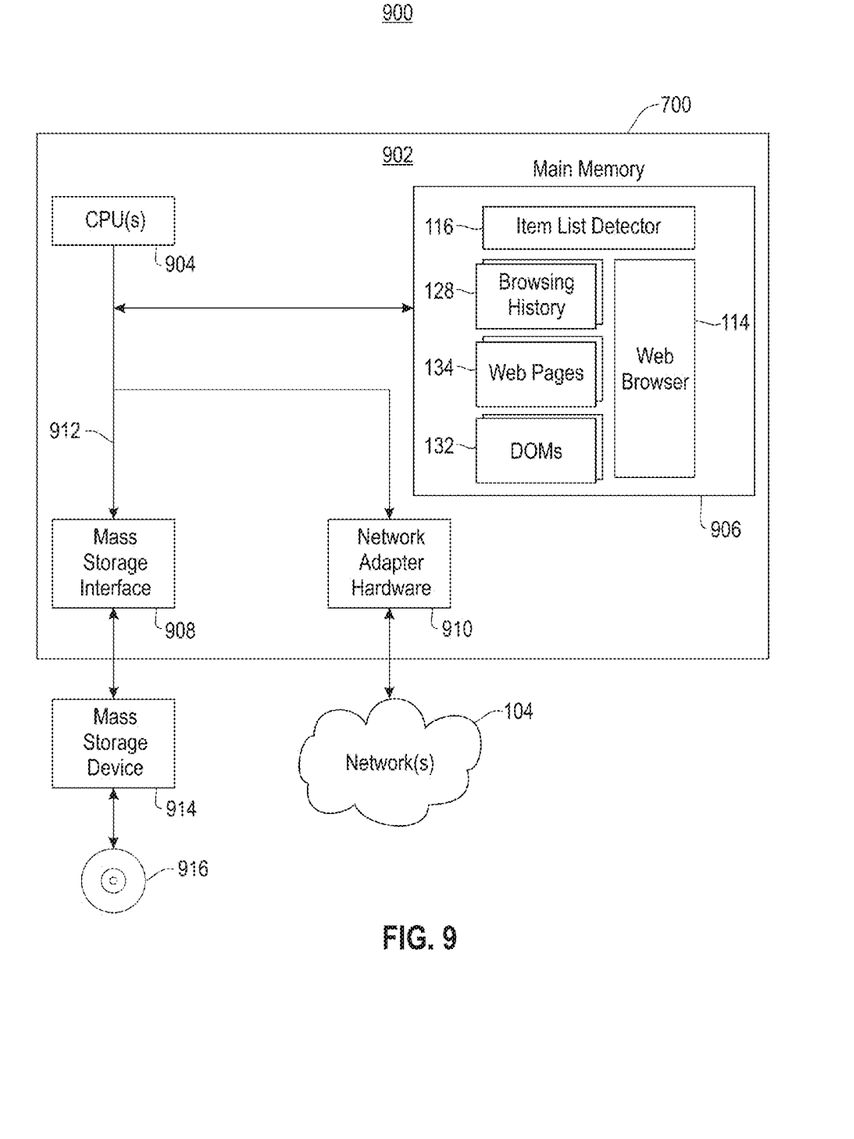
FIG. 9 is a block diagram illustrating a detailed view of an information processing system according to one embodiment of the present invention.

Referring now to FIG. 9, this figure is a block diagram illustrating an information processing system that can be utilized in embodiments of the present invention. The information processing system 900 is based upon a suitably configured processing system adapted to implement one or more embodiments of the present invention (e.g., the user system 102 of FIG. 1). Any suitably configured processing system can be used as the information processing system 900 in embodiments of the present invention.

The information processing system 900 includes a computer 902. The computer 902 has a processor(s) 904 that is connected to a main memory 906, mass storage interface 908, and network adapter hardware 910. A system bus 912 interconnects these system components. Although only one CPU 904 is illustrated for computer 902, computer systems with multiple CPUs can be used equally effectively. The main memory 906, in this embodiment, comprises the item list detector 116 and its components, the web browser 114, browsing interaction history 128, the web pages 130, and the DOMs 132.

The mass storage interface 908 is used to connect mass storage devices, such as mass storage device 914, to the information processing system 900. One specific type of data storage device is an optical drive such as a CD/DVD drive, which can be used to store data to and read data from a computer readable medium or storage product such as (but not limited to) a CD/DVD 916. Another type of data storage device is a data storage device configured to support, for example, NTFS type file system operations.

An operating system included in the main memory is a suitable multitasking operating system such as any of the Linux, UNIX, Windows, and Windows Server based operating systems. Embodiments of the present invention are also able to use any other suitable operating system. Some embodiments of the present invention utilize architectures, such as an object oriented framework mechanism, that allows instructions of the components of operating system to be executed on any processor located within the information processing system 900. The network adapter hardware 910 is used to provide an interface to a network 104. Embodiments of the present invention are able to be adapted to work with any data communications connections including present day analog and/or digital techniques or via a future networking mechanism.

Non-Limiting Examples

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:

analyzing a web browsing interaction history of a user associated with a given web page, the web browsing interaction history indicating that the user interacted with at least one element of the given web page;

constructing a document object model (DOM) of the given web page;

identifying, based on the analyzing, a node within the DOM corresponding to the at least one element in the given web page;

identifying an ancestor node of the node;

determining a distribution of node tag types for a set of child nodes associated with the identified ancestor node; and determining that the identified ancestor node comprises an item list including the at least one element within the given web page based on at least the distribution satisfying a given threshold, wherein each item in the item list corresponds to a child node in the set of child nodes, wherein determining that the identified ancestor node comprises an item list further comprises:

determining, based on the distribution, a number of matching child tags associated with each of the set of child nodes, wherein each of the matching child tags is a structure based tag, and wherein a structure based tag affects a structure of a web page;

determining if the number of matching child tags satisfies the given threshold;

based on at least the number of matching child tags satisfying the given threshold, identifying the identified ancestor node as a candidate node comprising the item list; and based on at least the number of matching child tags failing to satisfy the given threshold, determining that the identified ancestor node comprises the item list.

2. The method of claim 1, wherein the node is identified based on one of:

a pointer within the web browsing interaction history that points to the node; and a label of the element within the web browsing interaction history.

3. The method of claim 1, wherein determining that the identified ancestor node comprises the item list further comprises:

based on at least the number of matching child tags failing to satisfy the given threshold, performing a bottom-up search in the DOM for a first ancestor node of the identified ancestor node comprising at least a number of matching child tags that satisfies the given threshold; and identifying the first ancestor node as a candidate node comprising the item list.

4. The method of claim 3, further comprising:

determining that at least a second ancestor node of the first ancestor node fails to comprise a number matching child tags that satisfy the given threshold; and identifying the first ancestor node as the ancestor node of the node comprising the item list.

5. The method of claim 1, wherein identifying the identified ancestor node as a candidate node comprises:
    determining a similarity measure associated with the set of child nodes;
    comparing the similarity measure to a similarity threshold; and
    based on the similarity measure satisfying a similarity threshold, identifying the identified ancestor node as the candidate node comprising the item list.

6. The method of claim 5, wherein determining the similarity measure comprises:
    comparing a structure of each child node to other child nodes in the set of child nodes; and
    determining, based on the comparing, a number of child nodes in the set of child node comprising a matching structure, wherein the similarity measure is the number of child nodes comprising a matching structure.

7. A method, comprising:
    analyzing a web browsing interaction history of a user associated with a given web page, the web browsing interaction history indicating that the user interacted with at least one element of the given web page;
    constructing a document object model (DOM) of the given web page;
    identifying, based on the analyzing, a node within the DOM corresponding to the at least one element in the given web page;
    identifying an ancestor node of the node;
    determining a distribution of node tag types for a set of child nodes associated with the identified ancestor node; and
    determining that the identified ancestor node comprises an item list including the at least one element within the given web page based on at least the distribution satisfying a given threshold, wherein each item in the item list corresponds to a child node in the set of child nodes, wherein determining that the identified ancestor node comprises an item list further comprises:
        determining, based on the distribution, a number of matching child tags associated with each of the set of child nodes, wherein each of the matching child tags is a structure based tag, and wherein a structure based tag affects a structure of a web page;
        determining if the number of matching child tags satisfies the given threshold;
        based on at least the number of matching child tags satisfying the given threshold, identifying the identified ancestor node as a candidate node comprising the item list;
        based on at least the number of matching child tags failing to satisfy the given threshold, performing a bottom-up search in the DOM for a first ancestor node of the identified ancestor node comprising at least a number of matching child tags that satisfies the given threshold; and
        identifying the first ancestor node as a candidate node comprising the item list.

8. The method of claim 7, wherein the node is identified based on one of:
    a pointer within the web browsing interaction history that points to the node; and
    a label of the element within the web browsing interaction history.

9. The method of claim 7, further comprising:
    determining that at least a second ancestor node of the first ancestor node fails to comprise a number matching child tags that satisfy the given threshold; and
    identifying the first ancestor node as the ancestor node of the node comprising the item list.

10. A method, comprising:
    analyzing a web browsing interaction history of a user associated with a given web page, the web browsing interaction history indicating that the user interacted with at least one element of the given web page;
    constructing a document object model (DOM) of the given web page;
    identifying, based on the analyzing, a node within the DOM corresponding to the at least one element in the given web page;
    identifying an ancestor node of the node;
    determining a distribution of node tag types for a set of child nodes associated with the identified ancestor node; and
    determining that the identified ancestor node comprises an item list including the at least one element within the given web page based on at least the distribution satisfying a given threshold, wherein each item in the item list corresponds to a child node in the set of child nodes, wherein determining that the identified ancestor node comprises an item list further comprises:
        determining, based on the distribution, a number of matching child tags associated with each of the set of child nodes, wherein each of the matching child tags is a structure based tag, and wherein a structure based tag affects a structure of a web page;
        determining if the number of matching child tags satisfies the given threshold; and
        based on at least the number of matching child tags satisfying the given threshold, identifying the identified ancestor node as a candidate node comprising the item list, wherein identifying the identified ancestor node as a candidate node comprises:
            determining a similarity measure associated with the set of child nodes;
            comparing the similarity measure to a similarity threshold; and
            based on the similarity measure satisfying a similarity threshold, identifying the identified ancestor node as the candidate node comprising the item list.

11. The method of claim 10, wherein the node is identified based on one of:
    a pointer within the web browsing interaction history that points to the node; and
    a label of the element within the web browsing interaction history.

12. The method of claim 10, wherein determining the similarity measure comprises:
    comparing a structure of each child node to other child nodes in the set of child nodes; and
    determining, based on the comparing, a number of child nodes in the set of child node comprising a matching structure, wherein the similarity measure is the number of child nodes comprising a matching structure.

* * * * *